US007839883B2

(12) United States Patent
Dan et al.

(10) Patent No.: US 7,839,883 B2
(45) Date of Patent: Nov. 23, 2010

(54) METHODS AND APPARATUS FOR IMPLEMENTING A FLEXIBLE MULTI-USER ADVANCE RESERVATION SYSTEM WHERE RESERVATION REQUESTS ARE SPECIFIED IN TERMS OF MULTIPLE OPTIONS AND WHERE EACH OPTION HAS AN ASSOCIATED BUSINESS VALUE

(75) Inventors: Asit Dan, Pleasantville, NY (US); Robert Filepp, Westport, CT (US); Kavitha Ranganathan, New York, NY (US); Daniela Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 12/133,449

(22) Filed: Jun. 5, 2008

(65) Prior Publication Data

US 2008/0235065 A1    Sep. 25, 2008

Related U.S. Application Data

(63) Continuation of application No. 11/296,010, filed on Dec. 6, 2005, now abandoned.

(51) Int. Cl.
*H04L 12/40* (2006.01)
(52) U.S. Cl. .................. 370/439; 370/229; 370/238; 370/252; 370/442; 370/447; 370/461; 370/230; 370/235; 709/223; 709/224; 718/100; 718/101
(58) Field of Classification Search ......... 370/229–236, 370/238, 238.1, 252, 439, 442–444, 447, 370/461, 462; 709/223–226; 718/100–104
See application file for complete search history.

(56) References Cited

U.S. PATENT DOCUMENTS

| 6,480,861 | B1 * | 11/2002 | Kanevsky et al. ........ 707/103 Y |
|---|---|---|---|
| 6,857,020 | B1 * | 2/2005 | Chaar et al. .................. 709/226 |
| 7,035,808 | B1 * | 4/2006 | Ford .............................. 705/7 |
| 7,424,713 | B2 | 9/2009 | Fujino ......................... 718/104 |
| 2002/0095367 | A1 * | 7/2002 | Mizunuma et al. ............ 705/37 |
| 2004/0117290 | A1 * | 6/2004 | Shacham ..................... 705/37 |
| 2005/0097560 | A1 | 5/2005 | Rolia et al. ................. 718/104 |
| 2005/0172291 | A1 * | 8/2005 | Das et al. .................... 718/104 |
| 2005/0251573 | A1 * | 11/2005 | Merkow et al. ............ 709/226 |
| 2005/0262509 | A1 * | 11/2005 | Kelly ......................... 718/104 |
| 2007/0022425 | A1 | 1/2007 | Jackson ..................... 718/104 |
| 2007/0127527 | A1 * | 6/2007 | Dan et al. ................... 370/477 |

\* cited by examiner

*Primary Examiner*—Aung S Moe
*Assistant Examiner*—Christopher P Grey
(74) *Attorney, Agent, or Firm*—Harrington & Smith

(57) ABSTRACT

The present invention concerns methods and apparatus for implementing a multi-user advance reservation system where reservations are specified in terms of flexible constraints, inflexible constraints and business values. The specification of reservations in this manner allows an entity managing the reservation system to arbitrate among reservations received from a user population with a view toward maximizing business value across the user population. In methods and apparatus of the present invention, penalties and rewards associated with various reservation outcomes can be specified in reservations to assist in business value maximization. In an example, a reservation having a low business value may be declined when there is a significant possibility that a reservation having a high business would be submitted during the pendency of service delivery to the user issuing the reservation with a low business value.

35 Claims, 9 Drawing Sheets

210

```
RESOURCE TYPE = CPU
RESOURCE AMOUNT = 5
OS TYPE = LINUX
DURATION = 2 HOURS
START TIME: BEFORE 7 PM (BUSINESS VALUE = 5)
            OR 7 PM - 9 PM (BUSINESS VALUE = 3)
```

220

```
RESOURCE TYPE = CPU
OS TYPE = LINUX
RESOURCE AMOUNT = 5
DURATION = 2 HOURS
START TIME: BEFORE 7 PM (BUSINESS VALUE = 5)

OR

RESOURCE AMOUNT = 3
DURATION = 4 HOURS
START TIME: BEFORE 7 PM (BUSINESS VALUE = 2)
```

FIG.2

METHODS AND APPARATUS FOR IMPLEMENTING A FLEXIBLE MULTI-USER ADVANCE RESERVATION SYSTEM WHERE RESERVATION REQUESTS ARE SPECIFIED IN TERMS OF MULTIPLE OPTIONS AND WHERE EACH OPTION HAS AN ASSOCIATED BUSINESS VALUE

CROSS REFERENCE TO RELATED APPLICATION

This application is a continuation of U.S. patent application Ser. No. 11/296,010 filed Dec. 6, 2005 now abandoned.

TECHNICAL FIELD

The present invention generally concerns advance reservation systems, and more particularly concerns advance reservation systems where users placing reservations can specify various constraints, which may be flexible or inflexible, and assign business values to aspects of reservations so that an entity managing the resource being reserved can improve overall user satisfaction by maximizing business value across a population of users when deciding which reservations to fulfill.

BACKGROUND

In situations where a scarce resource is sought by multiple potential users, it has long been commonplace to accept reservations. In a typical scenario, the resource is reserved on a first come-first served basis, where the first users to place a reservation request are the first to receive a reservation.

This paradigmatic approach is fraught with limitations. In particular, potential resource users have little or no way to identify their true needs to the resource provider. As a result, the resource provider has no information with which to distinguish between potential resource users when arbitrating between users. The resource provider assumes that all users seeking a reservation place equal importance on receiving a reservation.

This is particularly true in instances where the resource provider is setting a price for a resource and the only decision that a potential resource user makes is whether to submit an advance reservation request for the resource. The problem is further compounded when there is little or no price discrimination practiced by a resource provider. In such situations, there is little opportunity for a potential resource user to "outbid" the other users by, for example, seeking a reservation for a more costly, and thus typically less-well-subscribed, service.

In each of these scenarios, the potential resource user is presented with effectively a binary decision criterion—place an advance reservation request or not place an advance reservation request. As a result, the resource provider plays little role, if any, other than by setting a price for the resource, when it comes to arbitrating between users.

Accordingly, those skilled in the art seek an advance reservation system that overcomes these problems. In particular, those skilled in the art seek methods and apparatus that allow a resource provider to play a larger role in arbitrating between potential resource users seeking resource reservations. In addition, those skilled in the art seek methods and apparatus that allow potential resource users to better indicate the value they place on receiving a reservation for a scarce resource.

SUMMARY OF THE PREFERRED EMBODIMENTS

The foregoing and other problems are overcome, and other advantages are realized, in accordance with the following embodiments of the present invention.

A first embodiment of the invention comprises a signal-bearing medium tangibly embodying a program of machine-readable instructions executable by a digital processing apparatus of a computer system to perform operations for managing an advance resource reservation system, the operations comprising: at the advance resource reservation system, receiving advance reservation requests for a resource submitted by a plurality of potential resource users, wherein each advance reservation request specifies at least one reservation fulfillment requirement that comprises multiple options indicating various ways in which a resource provider may meet the needs of a particular potential resource user issuing the advance reservation request, and wherein a business value is assigned to each of the multiple options; and analyzing each advance reservation request to determine if a reservation can be granted for at least one of the multiple reservation fulfillment requirement options.

In one variant of the first embodiment of the invention, analyzing each advance reservation request further comprises determining for a particular advance reservation request that a reservation will not be granted for any of the multiple reservation fulfillment requirement options; and informing a particular potential resource user that issued the particular advance reservation request that none of the multiple reservation fulfillment requirement options will result in a reservation.

In another variant of the first embodiment of the invention, analyzing each advance reservation request further comprises determining for a particular advance reservation request that a reservation will be granted for at least one of the multiple reservation fulfillment requirement options; and informing a particular potential resource user that issued the particular advance reservation request that a reservation will be granted for at least one of the multiple reservation fulfillment requirement options.

In a further variant of the first embodiment of the invention an advance reservation request received from a particular potential resource user specifies a time by which the particular potential resource user requires an indication whether the particular potential resource user will receive a resource reservation. In an additional step performed in this variant, a reservation is issued to the particular potential resource user at the time indicated in the advance reservation request.

In yet another variant of the first embodiment of the invention analyzing each advance reservation request further comprises: at a predetermined time, pre-allocating the resource among the plurality of potential resource users submitting advance reservation requests on the basis of a pre-determined business value allocation criterion applied to business values associated with particular reservation fulfillment requirement options, thereby resulting in a resource pre-allocation; identifying at least one advance reservation request containing at least one reservation fulfillment requirement option accommodated in the resource pre-allocation; and informing a resource user who submitted the at least one advance reservation request that a reservation will be granted for the at least one reservation fulfillment requirement option accommodated by the resource pre-allocation. In an additional step performed in this variant, a reservation is issued to the particular potential resource user. The reservation may specify a time when the resource will be provided to the particular potential resource user.

In a still further variant of the first embodiment of the invention operative after a particular potential resource user has received a reservation specifying a time when a resource will be delivered, additional operations are performed. These operations comprise: continuing to receive advance reservation requests after the resource, pre-allocation; at or prior to the time when the resource will be provided to the particular potential resource user holding the reservation, examining business values associated with reservation fulfillment requirement options specified in advance reservation requests received after the resource pre-allocation; determining whether any of the advance reservation requests received after the resource pre-allocation specify a reservation fulfillment requirement option having a higher business value than the business value associated with the reservation held by the particular potential resource user; and if so, re-allocating the resource in accordance with the higher business value specified in the advance reservation request received after the resource pre-allocation, wherein re-allocating the resource results in a resource re-allocation. In additional operations performed in this variant of the first embodiment, the reservation held by the particular potential resource user is cancelled; and the particular potential resource user is informed of the cancellation. In further operations, the cancellation of the reservation triggers a penalty provision imposed on a resource provider providing the resource In another variant of the first embodiment additional operations are performed after the reservation of the potential resource user is cancelled. These operations comprise: presenting the potential resource user whose reservation was cancelled with an opportunity to submit a new advance reservation request; and during the opportunity to submit a new advance reservation request, providing the potential resource user whose reservation was cancelled with at least one suggested business value which, if adopted by the potential resource user in a new advance reservation request, would result in the issuance of a new reservation.

In a further variant of the first embodiment additional operations are performed when it is determined that no reservation will result from a particular advance reservation request. Theses operations comprise: presenting the particular potential resource user who submitted an advance reservation request containing multiple reservation fulfillment requirement options, wherein it was determined that none of the multiple reservation fulfillment requirement options would result in a reservation, with an opportunity to submit a new advance reservation request; and during the opportunity to submit a new advance reservation request, providing the potential resource user with at least one suggested business value which, if adopted by the potential resource user in a new advance reservation request, would result in the issuance of reservation.

A second embodiment of the present invention comprises an advance resource reservation system comprising: at least one memory to store at least one program of machine-readable instructions, wherein the at least one program performs operations for managing allocation of a resource to potential resource users; a network interface for communicating with potential resource users over a network; and at least one processor coupled to the at least one memory, where the at least one processor performs at least the following operations when the at least one program is executed: receiving advance reservation requests for a resource submitted by a plurality of potential resource users, wherein each advance reservation request specifies at least one reservation fulfillment requirement that consists of multiple options indicating various ways in which a resource provider may meet the needs of a particular potential resource user issuing the advance reservation request, and wherein a business value is assigned to each of the multiple options; and analyzing each advance reservation request to determine if a reservation can be granted for at least one of the multiple reservation fulfillment requirement options.

In conclusion, the foregoing summary of the various embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 depicts advance reservation requests having at least one reservation fulfillment requirement specified in terms of multiple options, wherein each of the multiple options has an assigned business value, all in accordance with the invention;

DETAILED DESCRIPTION OF THE PREFERRED EMBODIMENTS

Figure 1:
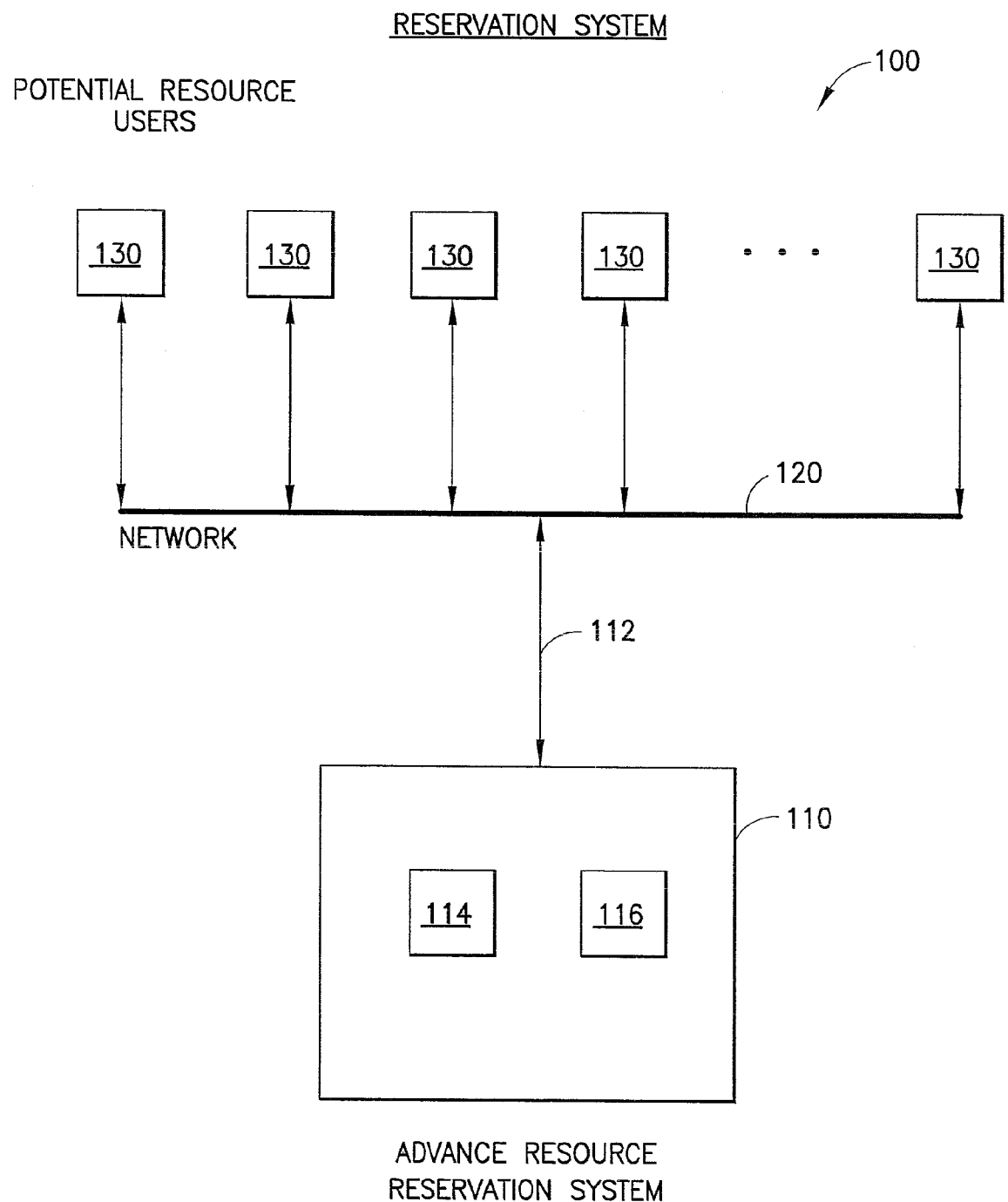
FIG. 1 depicts a system operating in accordance with the invention.

The invention is particularly well suited for implementation in a network environment, where reservation communications occur instantaneously. One possible implementation is depicted in FIG. 1. The reservation system 100 comprises an advance resource reservation system 110 communicating over a network 120 (which can be the Internet, a corporate intranet, etc.) with potential resource users 130. Resource users 130 are occasionally referred to herein as "potential" because at the time of submission of an advance reservation request, use of the resource attempting to be reserved has not occurred and is thus "potential". The advance resource reservation system is coupled to the network 120 by a bi-directional network interface 112 allowing two-way communication between the advance resource reservation system and potential resource users 130. The advance resource reservation system 110 further comprises at least one computer memory 114 and at least one computer processor 116 coupled to the at least one memory 114 and network interface 116. The at least one memory 114 is operable to store one or more computer programs capable of performing methods operating in accordance with the present invention when executed by the computer processor 116.

An advantageous aspect of the present invention is that resource users 130 specify multiple ways in which a resource provider may satisfy their need for a resource. This aspect is advantageous because resource users 130 often are frustrated by the "all or nothing" advance resource reservation systems of the prior art. For example, a first resource user may require that a small percentage of her advance reservation request be met immediately; but may be indifferent about whether the remaining portion is met now, or at a later time. A second resource user may be relatively indifferent about when a need for a resource is met, but may have varying needs for amounts of the resource. For example, the second resource user may absolutely require that 75% of his need for a resource be met, but may place less importance on whether the remaining 25% is met. "All or nothing" advance reservation systems do not take into account these details and frequently misallocate resources. A typical misallocation occurs in systems where the second resource user described above is bidding for a resource. The second resource user places more value on the first 75% of his need and is relatively indifferent about the remaining 25%. Thus, if a third resource user appears that would value the remaining 25% of the resource more highly than the second resource user, the remaining 25% should be allocated to the third resource user. If the advance resource reservation system is an "all or nothing" system, and the second resource user's bid is higher than the third resource user's bid, this fact will be ignored and a misallocation will occur.

In methods and apparatus of the present invention, this limitation of the prior art is overcome by providing potential resource users with the opportunity to specify their advance reservation requests with higher granularity. Advance reservation requests that may be submitted in embodiments of the present invention are depicted in FIG. 2. The advance reservation requests 210, 220 are presented by potential resource users seeking resource reservations in embodiments of the invention. As is apparent, the advance reservation requests 210, 220 specify various reservation fulfillment requirements such as, for example, a resource type sought (in the case, a CPU); a resource amount sought; the operating system used; resource delivery initiation; and resource delivery duration. As is also apparent in each of the advance reservation requests 210, 220 depicted in FIG. 2 at least one of the reservation fulfillment requirements is specified in terms of multiple options indicating various ways the needs of the potential resource user may be fulfilled by the resource provider. Further, each of the multiple options has an associated business value assigned by the potential resource user. For example, advance reservation request 210 specifies multiple options with respect to the reservation fulfillment requirement corresponding to the start time of resource delivery. Each of the multiple options has an associated business value assigned by the potential resource user that issued the advance reservation request 210. Likewise, advance reservation request 220 also specifies a reservation fulfillment requirement in terms of multiple options. In the case of advance reservation request 220, a business value is assigned to each of a combination of reservation fulfillment requirements. For example, advance reservation request 220 assigns a business value of 5 to a resource fulfillment requirement option comprised of a resource amount of 5; duration of resource use of 2 hours; and a start time of before 7 PM.

Figure 3:
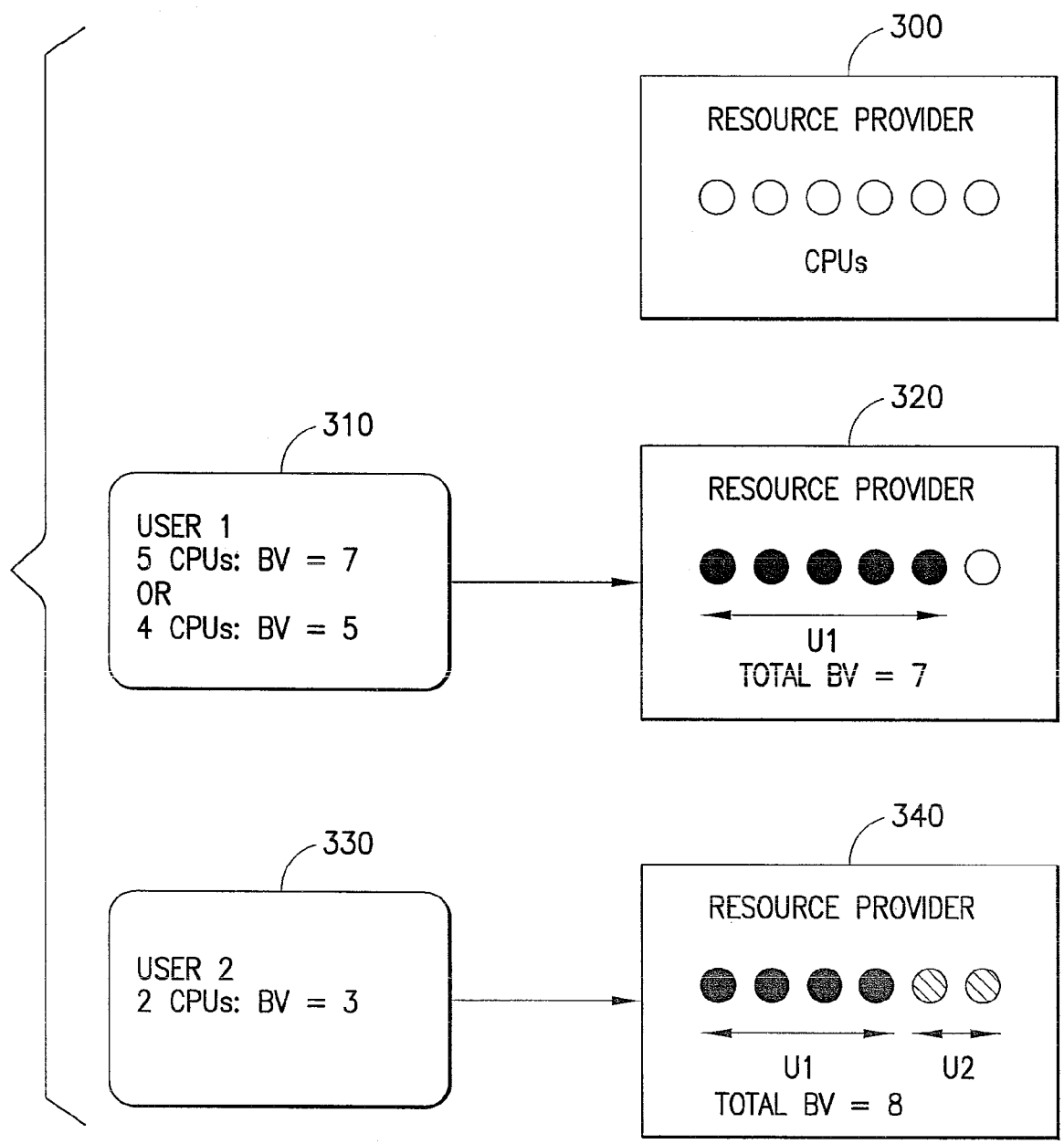
FIG. 3 conceptually depicts operation of the resource reservation method in accordance with the invention.

Steps performed in methods operating in accordance with the present invention are conceptually depicted in FIG. 3. A resource provider 300 has six available central processing units ("CPUs"). Suppose resource user 1 has two acceptable resource choices as shown by reference character 310—five CPUs with a business value equal to seven or four CPUs with a business value equal to five. The resource manager calculates that a net business value of 8 could be achieved if one CPU is removed from resource user 1 and allocated to resource user 2 instead. Resource user 1 is accordingly adjusted to its second choice of four CPUs (business value equal to five). The resulting total business value is eight (five plus three), which is greater than what was previously achieved, which was seven.

This process occurs without a re-negotiation between the resource provider and the resource user, saving time and processing spent in costly negotiation cycles. Moreover, resource wastage was avoided and the business value was increased by altering existing reservations. With fixed advances reservations, user 2 would not have been accommodated leading to one wasted CPU and lower total business value.

Figure 4:
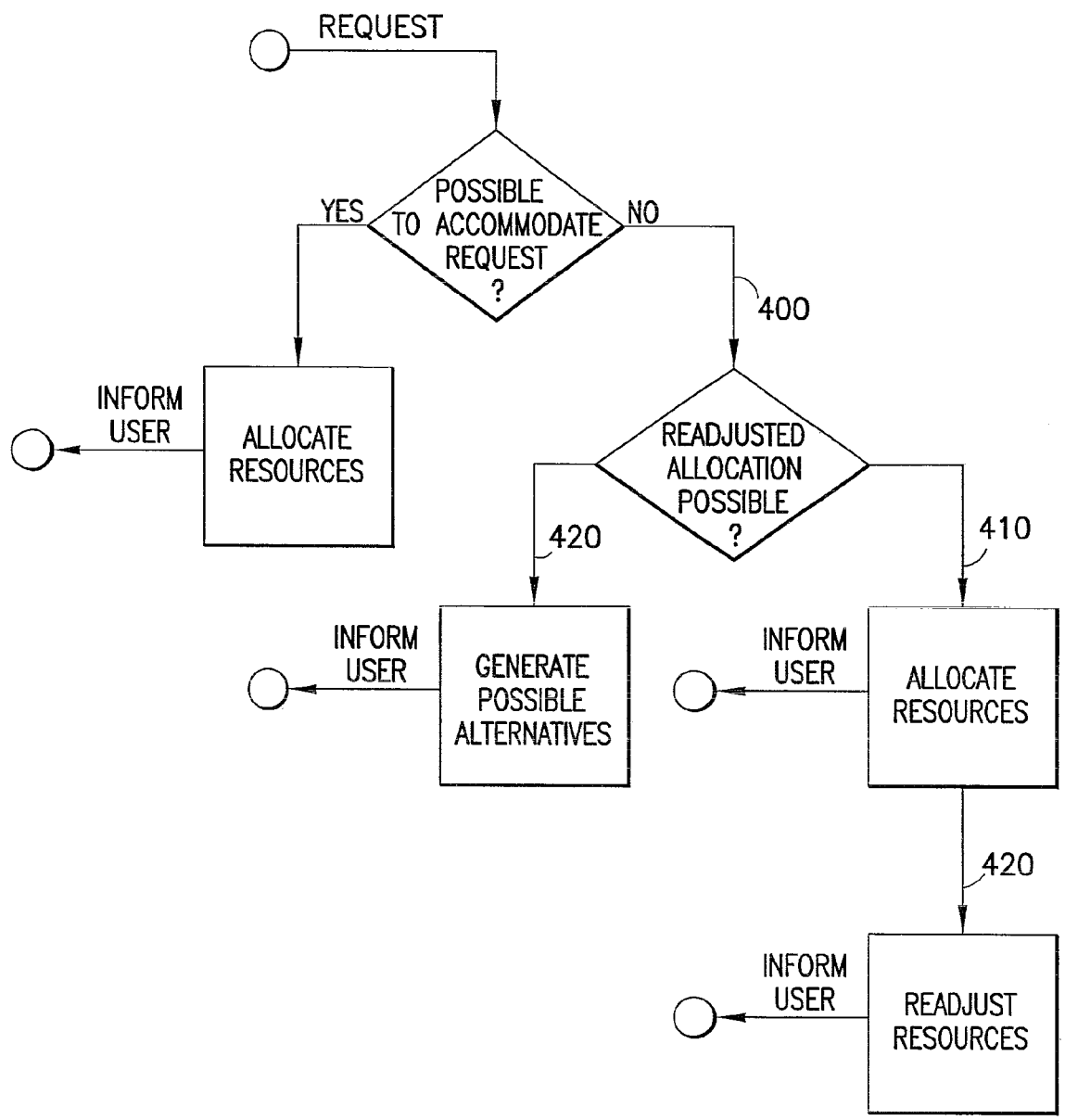
FIG. 4 is a flowchart depicting a method operating in accordance with the present invention.

FIG. 4 illustrates the process of how an incoming advanced reservation request is mapped to resources. The resource manager first checks if the request can be accommodated. If not, at 400, then it checks to see if existing reservations can be modified to accommodate the new request. For this step, it uses the resource alternatives provided by the other users, when the earlier requests were made. It also checks to see if the resulting business value obtained from the new configuration is greater than before.

If a better configuration is not found, then the provider can suggest a list of alternative resources that can be accommodated, and the user can start another negotiation process based on this suggested list of alternatives 430. This is called hint- or suggestion-driven negotiations.

If a better configuration is found, the new request is accommodated at 410, and at step 420 (a) the earlier requests are modified and the user is informed about the change or (b) the respective users are informed about their now invalid reservations and a new negotiation cycle between that user and the provider is started.

Figure 5:
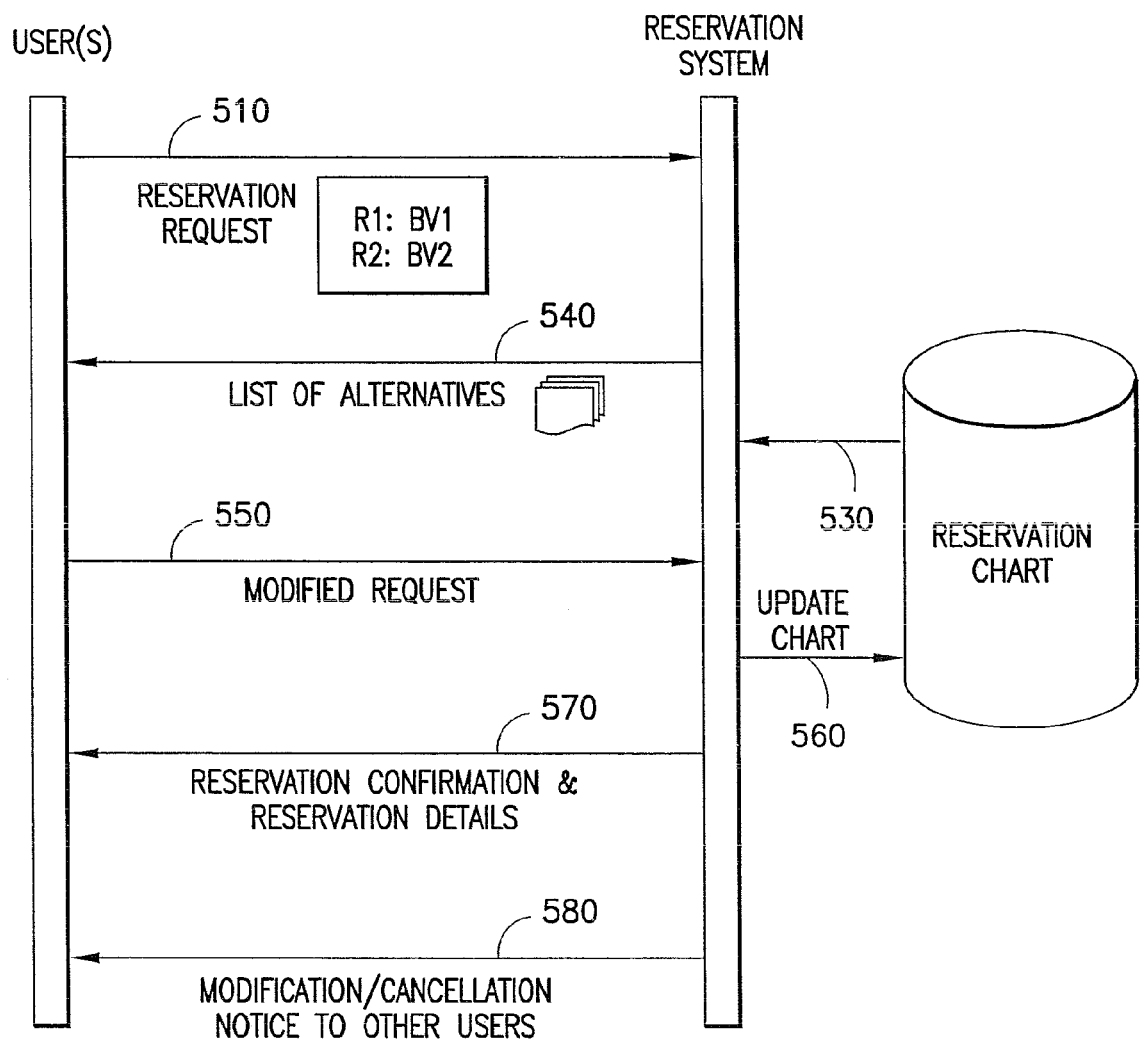
FIG. 5 conceptually depicts transactions that occur between potential resource users and the advance resource reservation system in methods of the present invention.

In embodiments of the invention, flexible reservations are specified by the interaction of a resource user or "job submitter" with an agreement management service. In a preferred embodiment reservations are stored in the form of an xml document conforming to the WS-Agreement specification, extended with an expression language. The core reservation specification process consists of the following main steps (some of which are shown in FIG. 5): preparation of the reservation; transmittal of the desired reservation to the agreement management service (step 510); evaluation of the reservation by the service; transmittal of possible alternative reservations from the agreement manager service to the user (step 540); re-submittal of modified request by the potential resource user (step 550); storage of accepted reservations by the service (step 560); transmittal of a confirmation from the agreement management service to the submitter (step 570); and transmission of modification/cancellation notices to other resource users (step 580).

Business value objective functions can be used to assist in the evaluation of the relative "goodness" or "business value" when allocating resources to jobs. For instance, business value might be expressed as a function of resource attribute capabilities modified by coefficient functions that provide a means to normalize between jobs.

In a preferred embodiment, an expression language is provided that enables users to convey the functions they wish performed as part of the business value calculation associated with a job request or class of job requests.

The core of the expression language is a set of arithmetic, relational, and conditional directives, conveyed as XML elements.

Examples of arithmetic directives are:
<Plus>, <Minus>, <Product>, <Division>.

Examples of relational directives are:
<Equal>, <Less>, <LessEqual>, <Greater>, <GreaterEqual>

An example of a conditional directive is:
<Not>

The conditional directive <Not> has a single operand which may be the result of prior expressions. It returns a value of 1 if the condition is true and a value of 0 if the condition is false. Arithmetic and relational directives each have 2 operands. The operands may be a) constants, b) resource attribute values, or c) results of prior expressions. Relational directives will return a value of 1 if the relationship is true and a value if 0 if the relationship is false.

Constants are strongly typed and are conveyed as XML elements as follows:
<IntConstant>—integer, <FloatConstant>—float, <LongConstant>—long, <Constant>—string.

Resource attribute values are extracted at run time and reflect the current state of managed resource attribute instances, for example: available memory on computer system X. Resource attribute values are referenced within expressions by an XML element as follows: <ResourceAttribute name="rname/aname."/> where rname is a well-known name for a resource and aname is a well-known name for the attribute of a resource.

EXAMPLE

```
<ResourceAttribute name="OperatingSystem/FreePhysicalMemory"/>.
<wsag:ValueExpression>
<Plus>
<IntConstant><Value>4</Value></IntConstant>
  <Product>
    <Division>
      <ResourceAttribute name="OperatingSystem/FreePhysicalMemory"/>
      <IntConstant><Value>1000000</Value></IntConstant>
    </Division>
    <IntConstant><Value>2</Value></IntConstant>
  </Product>
</Plus>
</wsag:ValueExpression>
```

External document variables may be referenced by standard qualified naming conventions, i.e. establishing an association of a prefix with a namespace, such as: xmlns:jsdl=http://www.ibm.com/scheduling/2005/07/abc and then referring to a document element, using an XPath-like notation. For example: "<abc:Scheduling/Priority>" refers to the value of the child element "priority" associated with current instance of an "abc:Scheduling" element.

Example of Expression Usage:

Pseudo-code:

```
If (OperatingSystem/OSMajorVersion = 5 &&
    OperatingSystem/OSMinorVersion = 2)
  then BusinessValue = 2;
```

-continued

```
else
  if (OperatingSystem/OSMajorVersion = 5 &&
      OperatingSystem/OSMinorVersion != 2)
    then BusinessValue = 1;
  else
    if (OperatingSystem/OSMajorVersion != 5 &&
        OperatingSystem/OSMinorVersion == 2)
      then BusinessValue = 1;
    else
      BusinessValue = 0;
```

Corresponding Expression XML:

```
<Plus>
  <Equal>
    <ResourceAttribute name="OperatingSystem/OSMajorVersion" />
    <Constant>
      <Value>5</Value>
    </Constant>
  </Equal>
  <Equal>
    <ResourceAttribute name="OperatingSystem/OSMinorVersion" />
    <Constant>
      <Value>2</Value>
    </Constant>
  </Equal>
</Plus>
```

An example of an Expression XML instance embedded within a WS-Agreement instance is provided in Appendix B.

Figure 6:
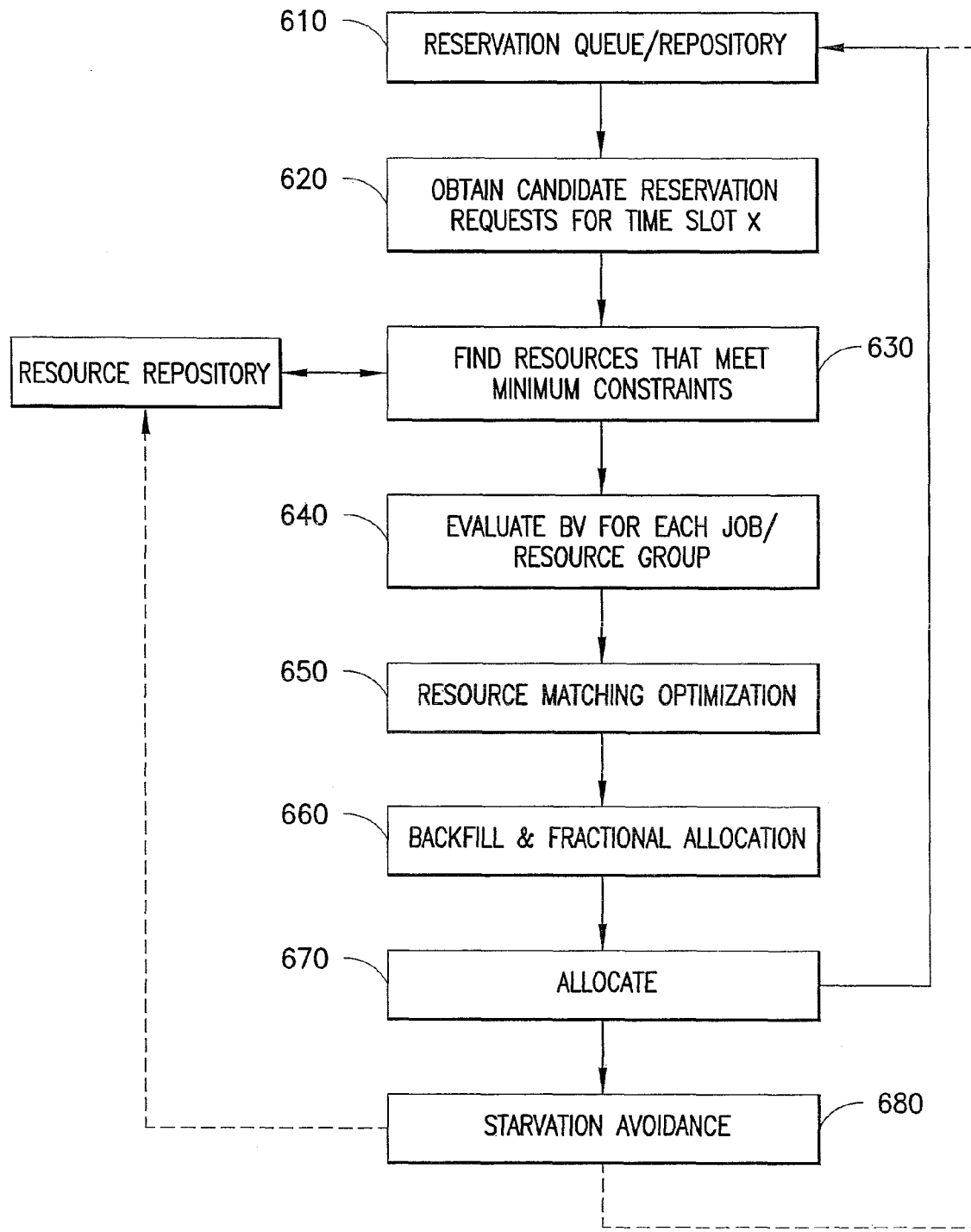
FIG. 6 is a flowchart depicting a method operating in accordance with the present invention.

The following steps are performed in the runtime component as depicted in FIG. 6. At step 610, advance reservation requests are received into the reservation queue. Then at step 620, advance reservation requests that are candidates for a particular time slot are obtained. Next at step 630, available resources that meet the minimum job requirements are identified. Then, at step 640, the business value of potential resource allocations to jobs is evaluated. Next, at step 650, resource allocation directives are prepared based on the comparison of the relative realizable business value between all job and resource possibilities (resource matching optimization). Then at step 660 backfilling is performed and shared use of resources is identified. Next, at step 670, the allocation is executed. Finally, at step 680 starvation avoidance method is implemented.

Note that Step 650 may be implemented using any of a variety of means, such as a genetic algorithms or heuristics. A particular algorithm may be selected by specifying dynamically loadable modules during system configuration. The resource matching problem is essentially a variation of a binary knapsack problem in which the set of candidate items is two dimensional, i.e. a number of alternative items (job/resource pairs) exist. As such, it is an "NP-complete" problem, or in other words, to arrive at a truly optimal solution all variations must be explored. Exploring every possible alternative does not scale well and so the preferred embodiment describes the use of a heuristic since this appears to be fairly efficient and reasonably effective.

The problem is stated as follows:

A scheduling domain may contain |R| resources, for which |J| jobs compete at any given time. A valuation expression $e_j$ is associated with each job $J_j$. Each job $J_j$ might execute on any of a number of qualified resources r ($r \subset R$). Each job and qualified resource pair belongs to a set of allocation alternatives A where $A \subset \{J_j \cap r\}$. Each allocation alternative $A_x$ is assigned a value, $v=f(e_i,A_x)$. An evaluated allocation alternative may be expressed as $A_i=(\alpha=(r_k)_{k=1,|a|},v_a=e_i)$.

The task is to find the selection of unique alternatives, $\exists!A$ ($\delta_i=1$ if $\exists!A_x$ selected, 0 if not) that meet the job requirements and attempt to meet the goal described below. The goal when allocating unique alternatives is to maximize (or at least improve) aggregate business value $$\sum_{i=1}^{n} \delta_i v_i$$

when allocating job alternatives to resources where the following constraints apply:

No more than one alternative may be selected per job.

$$\sum_{J(a_s)=i} \delta_s \leq 1 \forall\ i.$$

A resource may not be allocated more than once, $$\sum_{r\in(a_s)} \delta_s \leq 1 \forall\ r,$$

although subsequent processing may attempt to "backfill" resource allocations.

In a preferred implementation, job requests are associated with a job duration parameter. Availability time slots are associated with resources and are tracked and managed by the resource manager. Reservation constraints are mapped to time slots to determine the universe of requests to evaluate at any one point in time.

The steps depicted in FIG. 6 will now be described in greater detail. In a preferred embodiment, job reservation requests may be stored in a repository, keyed by earliest desired execution time and retrieved periodically by the runtime environment and added to a queue of outstanding requests. Alternatively the agreement manager, or a surrogate, may post reservation requests to the runtime environment, and the runtime environment may subsequently add them to a queue of outstanding requests. On a periodic basis the runtime environment, or reservation management function, obtains outstanding reservation requests and adds them to an evaluation queue.

A resource manager tracks the state of all resources that may be allocated across the entire system. In a preferred embodiment it keeps this state information in a database and keeps a subset of this information in a memory cache to speed access to commonly used information. Resources have capabilities as well as capacities. A capability is a specific attribute such as "Operating System", "Processor", or "Memory". A capacity is a quantity of an attribute. Not all attributes have quantities. An example of a capability is "Z-Series 990". Another example of a capability is "Linux". An example of a capacity is "amount of FreePhysicalMemory". When a job reservation request enters the runtime environment, the reservation manager asks the resource manager to find the set of resources that might meet the strict capabilities specified by the reservation request.

An alternative $A_x$ is created for each valid job request/candidate resource pair. The business value expression associated with each $A_x$ (obtained from the job request) is evaluated in light of state of valid candidate resource state.

```
******* Initial Alternatives **********
job id: 1, bv: 5, resource name = CS1 resource: 1
job id: 1, bv: 2, resource name = CS5 resource: 5
job id: 2, bv: 7, resource name = CS1 resource: 1
job id: 2, bv: 4, resource name = CS3 resource: 3
job id: 2, bv: 2, resource name = CS5 resource: 5
job id: 3, bv: 6, resource name = CS2 resource: 2
job id: 3, bv: 3, resource name = CS5 resource: 5
job id: 3, bv: 1, resource name = CS4 resource: 4
job id: 4, bv: 6, resource name = CS3 resource: 3
job id: 4, bv: 4, resource name = CS1 resource: 1
job id: 4, bv: 2, resource name = CS5 resource: 5
job id: 5, bv: 7, resource name = CS2 resource: 2
job id: 5, bv: 7, resource name = CS3 resource: 3
job id: 5, bv: 7, resource name = CS4 resource: 4
```

Alternatives A are sorted in descending order of value v, grouped by job id.

```
*********Sorted Altenatives ****************
job id: 2, bv: 7, resource name = CS1 resource: 1
job id: 2, bv: 4, resource name = CS3 resource: 3
job id: 2, bv: 4, resource name = CS3 resource: 3
job id: 2, bv: 2, resource name = CS5 resource: 5
job id: 5, bv: 7, resource name = CS2 resource: 2
job id: 5, bv: 7, resource name = CS3 resource: 3
job id: 5, bv: 7, resource name = CS4 resource: 4
job id: 3, bv: 6, resource name = CS2 resource: 2
job id: 3, bv: 5, resource name = CS3 resource: 3
job id: 3, bv: 3, resource name = CS5 resource: 5
job id: 3, bv: 1, resource name = CS4 resource: 4
job id: 4, bv: 6, resource name = CS3 resource: 3
job id: 4, bv: 4, resource name = CS1 resource: 1
job id: 4, bv: 2, resource name = CS5 resource: 5
job id: 1, bv: 5, resource name = CS1 resource: 1
job id: 1, bv: 2, resource name = CS5 resource: 5
```

Then for each J the highest value A is selected where the resource r is unassigned and this $A_x$ is kept in a pre-allocation list PL. Each lower value A associated with the current J is stored in an alternative list AL. If an unassigned r cannot be found for a $J_x$, all the unrealized alternatives for that job are stored in a "bumped" list BL.

At the end of this step PL will contain a primitive greedy solution to the allocation problem, AL will contain a list of the alternatives for each of the greedily allocated job requests and BL will contain a list of job requests that cannot obtain resources.

Then the overall business value that can be realized by allocating based on PL is stored: $S1=\Sigma_{i=1}^{''PL}\delta_i v_i$.

A copy of PL, PL→PLβ is retained.

```
****** Initial greedy allocation **********
job id: 2, bv: 7, resource name = CS1 resource: 1
job id: 5, bv: 7, resource name = CS2 resource: 2
job id: 3, bv: 5, resource name = CS3 resource: 3
job id: 4, bv: 2, resource name = CS5 resource: 5
```

While i<size of (BL) and while not all J have been assigned resources the first pre-allocated item $PL_k$ in PL that uses the resource r required by $BL_i$ is found. Next it is determined if there is an entry $AL_x$ that is an alternative to the $PL_k$ entry. If there are no alternatives, and if $BL_i$ has a value greater than the $PL_k$ item, then $PL_k$ is copied into a list of removed jobs, remove $PL_k$, and $BL_i$ inserted into PL. If there is an alternative $AL_x$ and the sum of $AL_xv+BL_iv>PL_kv$ then $PL_k$ is removed, $BL_i$ is copied into PL, $AL_x$ is copied into BL, and $AL_x$ is removed.

Once this loop is completed, sum the values of the items contained in the PL:

$$S2 = \Sigma_{i=1}^n PL(\delta_i v_i)$$

```
**** Suggested Allocation Result************
    job id: 2, bv: 7, resource name = CS1 resource: 1
    job id: 4, bv: 6, resource name = CS3 resource: 3
    job id: 3, bv: 6, resource name = CS2 resource: 2
    job id: 5, bv: 7, resource name = CS4 resource: 4
    job id: 1, bv: 2, resource name = CS5 resource: 5
```

The method chooses to allocate job/resource pairs from either PL from step 3 or PLβ from step 2, based on which list provides the greater value: allocation list=max(S1,S2).

```
***********Stats*****************
Overall business value of the initial job allocation: 21
Overall business value of the suggested job allocation: 28
```

After the optimization heuristic makes its recommendations some job requests may remain unfulfilled. The alternatives for these residual job requests are sorted by business value. The residual alternatives are examined to determine whether they make use of either 1) unallocated fractions of resources, or 2) resources that have available "whitespace", i.e. resources that have been allocated for future use but are currently available for some limited and known period. If the residual requests can either use the residual resource capacity or can fit into available "whitespace" then they may also be allocated. Once an alternative for a job request is allocated any remaining alternatives derived from the same job request are purged from the list of residual alternatives. Any job requests that still remain unfilled at the end of step 4 are placed back into queue J so that they may be processed in a subsequent scheduling cycle.

Starvation avoidance is achieved by gradually incrementing the business value of job requests that were deferred and re-queued by previous iterations of the run-time steps.

Figure 7:
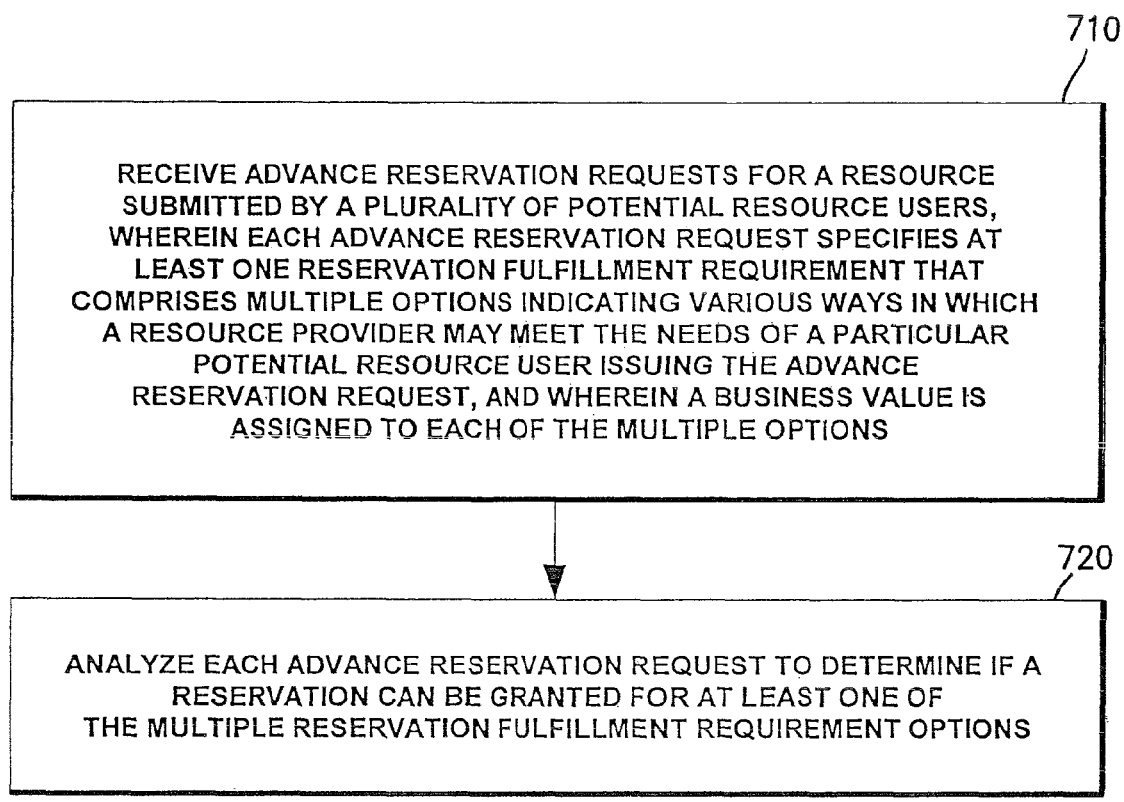
FIG. 7 is a flowchart depicting a method operating in accordance with the invention.

Additional methods operating in accordance with the present invention will now be described with reference to FIGS. 7-9. FIG. 7 depicts a method that is generally applicable in an advance resource reservation system like that depicted in FIG. 1 for managing allocation of a resource. At step 710, the advance resource reservation system receives requests for a resource submitted by a plurality of potential resource users, wherein each advance reservation request specifies at least one reservation fulfillment requirement that comprises multiple options indicating various ways in which a resource provider may meet the needs of a particular potential resource user issuing the advance reservation request, and where a business value is assigned to each of the multiple options. Next, at step 720, the advance resource reservation system analyzes each advance reservation request to determine if a reservation can be granted for at least one of the multiple reservation fulfillment requirement options.

In various embodiments of the invention, the business values may be assigned to the reservation fulfillment requirement options by the potential resource users or by the resource provider. For example, the business values assigned to each of the multiple reservation fulfillment requirement options may be selected by a potential resource user prior to a time when an advance reservation request containing the multiple reservation fulfillment requirement options is submitted to the advance resource reservation system. Alternatively, the business value assigned to each of the multiple reservation fulfillment requirement options may be selected by the resource provider after an advance reservation request containing the multiple reservation fulfillment requirement options is received by the resource provider. This may be done by the resource provider in accordance with a business value schedule already agreed to by the potential resource user in order to reduce the size of the communication necessary to request a reservation. It may also be done when the business values are dependent on variables known better to the resource provider.

Further, the reservation fulfillment requirement comprised of multiple options may correspond to two or more discrete options or to a continuous range wherein any value within the range corresponds to a distinct option. In addition, different business values can be assigned to each discrete option in the first case, or to portions of the range in the second case. In the second case, business values can be related to portions of the range by a mathematical equation or other formalism.

Additional steps may be performed under the aegis of analyzing each advance reservation request to determine if a reservation can be granted for at least one of the multiple reservation fulfillment requirement options. For example, in one step, it may be determined for a particular advance reservation request that a reservation will not be granted for any of the multiple reservation fulfillment requirement options; and in another step a particular potential resource user that issued the particular advance reservation request will be informed that none of the multiple reservation fulfillment requirement options will result in a reservation. In another example, in one step it may determined for a particular advance reservation request that a reservation will be granted for at least one of the multiple reservation fulfillment requirement options; and in another step a particular potential resource user that issued the particular advance reservation request will be informed that a reservation will be granted for at least one of the multiple reservation fulfillment requirement options.

In another variant of the method depicted in FIG. 7, the advance reservation request received from a particular potential resource user may specify a time by which the particular potential resource user requires an indication whether the particular potential resource user will receive a resource reservation. In situations where it is determined that a particular potential resource user who has specified a time by which a reservation decision is needed will be granted a reservation, an additional step of issuing a reservation to the particular potential resource user is performed. The reservation is issued at or before the time specified in the advance reservation request.

Figure 8:
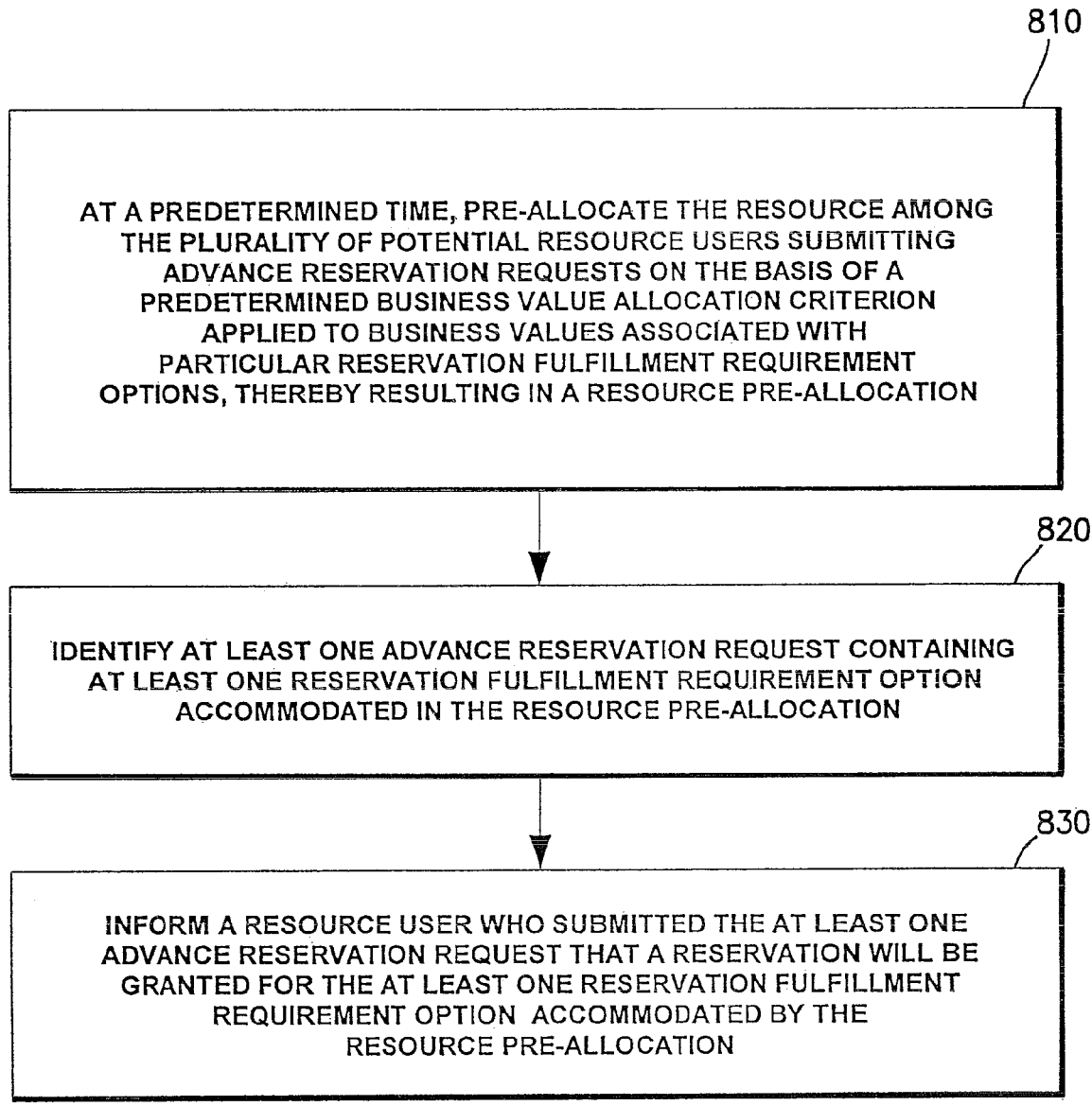
FIG. 8 is a flowchart depicting a method operating in accordance with the invention.
Figure 9:
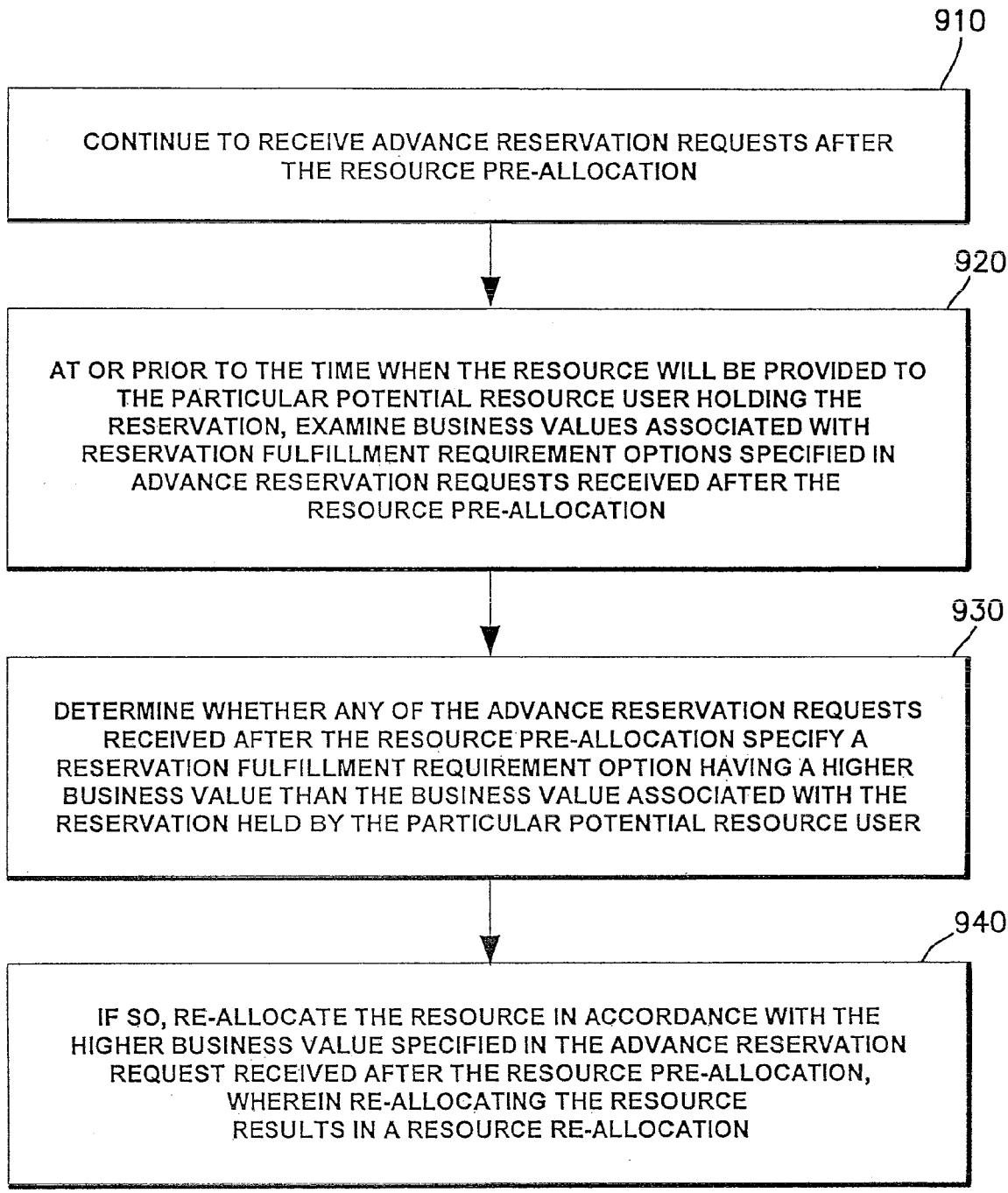
FIG. 9 is a flowchart depicting a method operating in accordance with the invention

In further variants of the method depicted in FIG. 7, analyzing each advance reservation request to determine if a reservation can be granted for at least one of the multiple reservation fulfillment requirement options is performed starting with a pre-allocation step as depicted in FIG. 8. "Pre-allocation" means setting aside a portion or more of the resource available for use at a later time by one of the potential resource users submitting advance reservation requests. It does not mean actually providing the resource to the potential resource user at the time of the pre-allocation. dependence on the desired resource delivery times specified in the advance reservation requests. The pre-allocation may be done at a time that would accommodate a just-in-time delivery criterion.

In the method depicted in FIG. 8, many criteria may be adopted for pre-allocating the resource among the plurality of potential resource users on the basis of business values specified with respect to particular reservation fulfillment requirement options. One such criterion would maximize collective business values across a population of potential resource users in the resource pre-allocation.

Additional steps to formalize the granting of a reservation may be performed at or after step 830. For example, a reservation may be issued as soon as the resource pre-allocation is completed. Alternatively, the reservation may be withheld until a time specified by the potential resource user. Regarding the details of the reservation, the reservation may be granted for one or more of the reservation fulfillment requirement options specified in an advance reservation request, and may further specify the time when the resource will be provided to a particular potential resource user. For further allocation operations, a reservation or reservation component will be assigned the business value associated with the reservation fulfillment requirement option that resulted in the granting of the reservation or reservation component.

In embodiments of the invention concerned with activities after a reservation has been granted, the decision to grant the reservation may be revisited to ensure that the resource continues to be provided to resource users who assign the highest business value to the resource. Steps accomplishing this advantageous aspect of the invention are depicted in FIG. 9. At step 910, the advance resource reservation system continues to receive advance reservation requests after the resource pre-allocation. Then at step 920, at or prior to the time when the resource will be provided to the particular potential resource user holding the reservation, business values associated with reservation fulfillment requirement options specified in advance reservation requests received after the resource pre-allocation are examined. Next, at step 930, it is determined whether any of the advance reservation requests received after the resource pre-allocation specify a reservation fulfillment requirement option having a higher business value than that associated with the reservation held by a particular potential resource user. If so, at step 940, the resource is re-allocated in accordance with the higher business value specified in the advance reservation request received after the resource pre-allocation. Re-allocating the resource in step 940 results in a resource re-allocation.

As a result of the resource re-allocation additional steps may be performed. For example, the resource re-allocation may result in cancellation of the reservation held by a particular potential resource user. In such situations one step is performed to cancel the reservation held by the particular potential resource user; and in another step the particular potential resource user is informed of the reservation cancellation. In other situations where a reservation has multiple components associated with multiple reservation fulfillment requirement options having differing associated business values, one or more of the components may be cancelled and one or more of the components may survive the re-allocation and hence remain as valid. This aspect of the present invention is particularly advantageous because it insures that whenever possible, an advance reservation request specifying a higher business value will be granted the resource over an advance reservation request (which may have matured into a reservation) specifying a lower business value.

In further embodiments of the invention, the cancellation of a reservation may result in the performance of additional steps. In certain of these embodiments, the additional steps may trigger a penalty provision which is imposed on the resource provider canceling the reservation.

In other embodiments, the cancellation of a reservation may trigger a new round of negotiations for a reservation. In such embodiments additional steps may be performed. One step would comprise presenting the particular potential resource user whose reservation was cancelled with an opportunity to submit a new advance reservation request and another step would comprise providing the potential resource user whose reservation was cancelled with at least one suggested business value which, if adopted by the potential resource user in a new advance reservation request, would result in the issuance of a new reservation to the particular potential resource user. Following these steps, further steps would be performed. One further step would comprise receiving from the potential resource user whose reservation was cancelled a new advance reservation request, wherein the new advance reservation request specifies at least one reservation fulfillment requirement option having a new business value that is at least as great as the suggested business value; another step would comprise analyzing the new advance reservation request to identify the new business value; and yet another step would comprise re-allocating the resource among the plurality of potential resource users on the basis of business values specified by each of the plurality of potential resource users with respect to particular reservation fulfillment options, including the new business value specified by the particular potential resource user whose reservation was cancelled, wherein the re-allocation results in a new resource re-allocation. In another step a reservation would be issued to the particular potential resource user whose reservation was cancelled.

In situations following the steps described with respect to FIG. 7 where a particular potential resource user is informed that none of the reservation fulfillment requirement options specified in an advance reservation request submitted by the particular potential resource user will result in a reservation, similar hint-driven steps may be performed. In one such step, the potential resource user who submitted an advance reservation request containing multiple reservation fulfillment requirement options, wherein it was determined that none of the multiple reservation fulfillment requirement options would result in a reservation, would be presented with an opportunity to submit a new advance reservation request; and in another step during the opportunity to submit a new advance reservation request, the potential resource user would be provided with at least one suggested business value which, if adopted by the potential resource user in a new advance reservation request, would result in the issuance of reservation.

Another advantageous aspect of the invention accommodates mandatory reservations. In certain situations, a resource user and a resource provider may desire to operate in a system that both honors a certain number of mandatory reservations and allocates remaining reservations on the basis of maximizing business values among a population of resource users. This method is a variant of the method depicted in FIG. 8 and operates in the following manner when it is known that an advance reservation request specifies a mandatory reservation fulfillment requirement that must be met by a resource provider. Prior to step 810 of pre-allocating the resource, the advance resource reservation system identifies the particular advance reservation request specifying a mandatory reservation fulfillment requirement and the particular potential resource user who presented the advance reservation request containing the mandatory reservation fulfillment requirement. Then, the advance resource reservation system performs another step prior to step 810, wherein a portion of the resource corresponding to the amount specified in the mandatory reservation fulfillment requirement is allocated to the particular potential resource user who presented the advance reservation request containing the mandatory reservation fulfillment requirement. Then step 810 is performed wherein the resource remaining is pre-allocated with a view to maximizing collective business value across a population of resource users.

Another advantage of the present invention is that a starvation avoidance allocation method can be implemented to make sure that at least some of the resource is allocated to those potential resource users who habitually specify lower business values in their advance reservation requests. The starvation avoidance allocation method would be implemented after multiple resource pre-allocation and resource provision cycles where the resource is actually provided to potential resource users. In a first step of the starvation avoidance method, potential resource users who over a course of a plurality of resource pre-allocation and resource provision cycles have been provided less than a pre-determined minimum amount of the resource would be identified. Then in a next step, during at least one following resource pre-allocation and resource provision cycle, a portion of the resource available for pre-allocation would be set aside for those potential resource users who over a course of a plurality of resource pre-allocation and resource provision cycles have been provided less than a pre-determined minimum amount of the resource. Then, in a further step the portion of the resource available to those potential resource users who have been provided less than a pre-determined minimum amount of the resource would be pre-allocated on the basis of business values specified by each of the plurality of potential resource users in their advance reservation requests with respect to particular reservation fulfillment requirement options, wherein the pre-allocation results in a starvation avoidance resource pre-allocation. Next, binding resource reservations would be issued to those potential resource users accommodated under the starvation avoidance resource pre-allocation.

One of ordinary skill in the art will understand that the methods depicted and described herein can be embodied in a tangible machine-readable memory medium. A computer program fixed in a machine readable memory medium and embodying a method or methods of the present invention perform steps of the method or methods when executed by a digital processing apparatus coupled to the machine-readable memory medium. Tangible machine-readable memory media include, but are not limited to, hard drives, CD- or DVD-ROM, flash memory storage devices or in a RAM memory of a computer system.

Thus it is seen that the foregoing description has provided by way of exemplary and non-limiting examples a gull and informative description of the best method and apparatus presently contemplated by the inventors for implementing a multi-user advance reservation system where reservations are specified in terms of multiple options, and where each option has an associated business value. One skilled in the art will appreciate that the various embodiments described herein can be practiced individually; in combination with one or more other embodiments described herein; or in combination with advance reservation systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

APPENDIX A

Pseudo-code: BV = ((FreeMemory / 1 million ) *80) + 8)

```xml
<?xml version="1.0" encoding="UTF-8"?>
<wsag:AgreementOffer
 xmlns:xsi="http://www.w3.org/2001/XMLSchema-instance"
 xmlns:wsa="http://schemas.xmlsoap.org/ws/2003/03/addressing"
 xmlns:wsbf="http://www.ibm.com/xmlns/stdwip/web-services/
WS-BaseFaults"
 xmlns:wsag="http://www.ggf.org/namespaces/ws-agreement"
 xsi:schemaLocation="http://www.ggf.org/namespaces/ws-agreement .. \
schemas\agreement_types-hgi.xsd
http://www.ibm.com/namespaces/abc/expressions/1.2 .. \schemas\
template_exp.xsd" >
<wsag:Terms>
 <wsag:All>
  <wsag:GuaranteeTerm>
   <wsag:BusinessValueList>
    <wsag:Reward>
     <wsag:ValueExpression>
      <Plus>
       <IntConstant><Value>8</Value></IntConstant>
       <Product>
        <Division>
         <ResourceAttribute name="OperatingSystem/
FreePhysicalMemory"/>
         <IntConstant><Value>1000000</Value></IntConstant>
        </Division>
        <IntConstant><Value>80</Value></IntConstant>
       </Product>
      </Plus>
     </wsag:ValueExpression>
    </wsag:Reward>
   </wsag:BusinessValueList>
  </wsag:GuaranteeTerm>
 </wsag:All>
</wsag:Terms>
</wsag:AgreementOffer>
```

We claim:

1. A computer readable memory device tangibly embodying a program of machine-readable instructions executable by a digital processing apparatus of a computer system to perform operations for managing an advance resource reservation system, the operations comprising:
   receiving from one of a plurality of potential resource users, an advance reservation request that specifies a set of reservation fulfillment requirements that comprises multiple reservation fulfillment options indicating various ways in which a resource provider may satisfy the set of reservation fulfillment requirements, wherein a business value is assigned to each of the multiple reservation fulfillment options; and
   analyzing the received advance reservation request to determine if a reservation can be granted that specifies at least one of the multiple reservation fulfillment options, where analyzing comprises at a predetermined time pre-allocating a resource among the plurality of potential resource users submitted advance reservation requests, the resource pre-allocation being based at least in part on a pre-determined value allocation criterion applied to the business values associated with the multiple reservation fulfillment option from the one potential user and from others of the plurality of potential resource users submitting advance reservation requests.

2. The computer readable memory device of claim 1, wherein the business value assigned to each of the multiple reservation fulfillment options is selected by a potential resource user prior to a time when an advance reservation request containing the multiple reservation fulfillment options is submitted to the advance resource reservation system.

3. The computer readable memory device of claim 1, wherein the business value assigned to each of the multiple reservation fulfillment options is selected by the resource provider after an advance reservation request containing the multiple reservation fulfillment options is received by the advance resource reservation system.

4. The computer readable memory device of claim 1, wherein the operations further comprise:
   determining for a particular advance reservation request that a reservation will not be granted for any of the multiple reservation fulfillment requirement options; and
   informing a particular potential resource user that issued the particular advance reservation request that none of the multiple reservation fulfillment requirement options will result in a reservation.

5. The computer readable memory device of claim 1, wherein the operations further comprise:
   determining for a particular advance reservation request that a reservation will be granted for at least one of the multiple reservation fulfillment requirement options; and
   informing a particular potential resource user that issued the particular advance reservation request that a reservation will be granted for at least one of the multiple reservation fulfillment requirement options.

6. The computer readable memory device of claim 1, wherein an advance reservation request received from a particular potential resource user specifies a time by which the particular potential resource user requires an indication whether the particular potential resource user will receive a resource reservation.

7. The computer readable memory device of claim 6, wherein the operations further comprise:
   issuing a reservation to the particular potential resource user at or before the time specified by the particular potential resource user.

8. The computer readable memory device of claim 1, wherein analyzing each advance reservation request to determine if a reservation can be granted further comprises:
   identifying at least one of the multiple reservation fulfillment options that is accommodated by the resource pre-allocation; and
   informing the one potential resource user that a reservation is granted for at least one of the multiple reservation fulfillment options that is accommodated by the resource pre-allocation.

9. The computer readable memory device of claim 8, wherein the pre-determined time is determined in dependence on a time specified in the advance reservation request submitted to the advance resource reservation system by the potential resource user who will receive a resource reservation under the resource pre-allocation, wherein the time specified in the advance reservation request corresponds to a time by which the potential resource user requires an indication whether a reservation will be granted for any of the reservation fulfillment requirement options specified in the advance reservation request.

10. The computer readable memory device of claim 8, wherein advance reservation requests submitted to the advance resource reservation system specify desired resource delivery times, and wherein the pre-determined time when resource pre-allocation occurs is determined in dependence on desired resource delivery times specified in the advance reservation requests.

11. The computer readable memory device of claim 10, wherein the pre-determined time when resource pre-allocation occurs is determined from the desired resource delivery times specified in the advance reservation requests using a just-in-time criterion.

12. The computer readable memory device of claim 8, wherein the pre-determined business value allocation criterion corresponds to a criterion which maximizes collective business values across a population of potential resource users in the resource pre-allocation.

13. The computer readable memory device of claim 8, wherein informing the particular potential resource user further comprises:
   issuing a reservation to the particular potential resource user.

14. The computer readable memory device of claim 13, wherein the reservation corresponds to at least one reservation requirement fulfillment option specified by the particular potential resource user.

15. The computer readable memory device of claim 13, wherein the reservation specifies a time when the resource will be provided to the particular potential resource user.

16. The computer readable memory device of claim 15, wherein the operations further comprise:
   continuing to receive advance reservation requests after the resource pre-allocation;
   at or prior to the time when the resource will be provided to the particular potential resource user holding the reservation, examining business values associated with reservation fulfillment requirement options specified in advance reservation requests received after the resource pre-allocation;
   determining whether any of the advance reservation requests received after the resource pre-allocation specify a reservation fulfillment requirement option having a higher business value than the business value associated with the reservation held by the particular potential resource user; and
   if so, re-allocating the resource in accordance with the higher business value specified in the advance reservation request received after the resource pre-allocation, wherein re-allocating the resource results in a resource re-allocation.

17. The computer readable memory device of claim 16, wherein as a result of the resource re-allocation the particular potential resource user holding the reservation is no longer accommodated, wherein the operations further comprise:
   canceling the reservation held by the particular potential resource user; and
   informing the particular potential resource user of the reservation cancellation.

18. The computer readable memory device of claim 16, wherein the reservation held by the potential resource user comprises at least two reservation components, wherein each of the at least two reservation components resulted from different reservation fulfillment requirement options, and wherein each of the at least two reservation components is associated with a business value assigned to the reservation fulfillment requirement option from which it resulted, wherein the operations further comprise:
   preserving as valid at least one of the at least two reservation components due to the at least one reservation component having a sufficiently high business value to continue to be allocated at least a portion of the resource under the resource re-allocation;

canceling at least one of the at least two reservation components due to the at least one reservation component having an insufficiently high business value so that it is not allocated any of the resource under the resource re-allocation; and informing the particular potential resource user of the cancellation of at least one of the at least two reservation components.

19. The computer readable memory device of claim 8, whereby at least one of the reservation fulfillment requirement options specified in a particular advance reservation request corresponds to a mandatory reservation fulfillment requirement, and wherein the operations further comprise:

prior to pre-allocating the resource among the plurality of potential resource users, identifying the advance reservation request specifying the mandatory reservation fulfillment requirement and the potential resource user who submitted the mandatory reservation fulfillment requirement; and during pre-allocation, pre-allocating a portion of the resource to the potential resource user who submitted the advance reservation request specifying the mandatory reservation fulfillment requirement, wherein the portion allocated corresponds to an amount specified in the mandatory reservation fulfillment requirement.

20. The computer readable memory device of claim 17, wherein the operations further comprise:

presenting the potential resource user whose reservation was cancelled with an opportunity to submit a new advance reservation request; and during the opportunity to submit a new advance reservation request, providing the potential resource user whose reservation was cancelled with at least one suggested business value which, if adopted by the potential resource user in a new advance reservation request, would result in the issuance of a new reservation.

21. The computer readable memory device of claim 20, wherein the operations further comprise:

receiving from the potential resource user whose reservation was cancelled a new advance reservation request, wherein the new advance reservation request specifies at least one reservation fulfillment requirement option having a new business value that is at least as great as the suggested business value;

analyzing the new advance reservation request to identify the new business value; and re-allocating the resource among the plurality of potential resource users on the basis of business values specified by each of the plurality of potential resource users with respect to particular reservation fulfillment options, including the new business value specified by the particular potential resource user whose reservation was cancelled, wherein the re-allocation results in a new resource re-allocation.

22. The computer readable memory device of claim 21, whereby the particular potential resource user whose reservation was cancelled is accommodated by the new resource allocation, and wherein the operations further comprise:

issuing a new reservation to the particular potential resource user whose reservation was cancelled.

23. The computer readable memory device of claim 4, wherein the operations further comprise:

presenting the particular potential resource user who submitted an advance reservation request containing multiple reservation fulfillment requirement options, wherein it was determined that none of the multiple reservation fulfillment requirement options would result in a reservation, with an opportunity to submit a new advance reservation request; and during the opportunity to submit a new advance reservation request, providing the potential resource user with at least one suggested business value which, if adopted by the potential resource user in a new advance reservation request, would result in the issuance of reservation.

24. The computer readable memory device of claim 15, wherein the operations further comprise:

providing the resource to the particular potential resource user at the time specified in the reservation.

25. The computer readable memory device of claim 24, whereby the operations are repeated over multiple resource pre-allocation cycles wherein after which each pre-allocation cycle the resource is provided to those potential resource users holding reservations during resource provision cycles, the operations further comprising:

identifying potential resource users who over a course of a plurality of resource pre-allocation and resource provision cycles have been provided less than a pre-determined minimum amount of the resource;

during at least one following resource pre-allocation and resource provision cycle, setting aside a portion of the resource available for pre-allocation to those potential resource users who over a course of a plurality of resource allocation and resource provision cycles have been provided less than a pre-determined minimum amount of the resource; and pre-allocating the portion of the resource available to those potential resource users who have been provided less than a predetermined minimum amount of the resource on the basis of business values specified by each of the plurality of potential resource users in their advance reservation requests with respect to particular reservation fulfillment requirement options, wherein the pre-allocation results in a starvation avoidance resource pre-allocation; and issuing binding resource reservations to those potential resource users accommodated under the starvation avoidance resource pre-allocation.

26. The computer readable memory device of claim 1, wherein at least one of the multiple reservation fulfillment requirement options specified in a particular advance reservation request concerns an amount of resource required by the potential resource user issuing the particular advance reservation request.

27. The computer readable memory device of claim 1, wherein the at least one of the multiple reservation fulfillment requirement options specified in a particular advance reservation request concerns a time when the resource is required by the potential resource user issuing the particular advance reservation request.

28. The computer readable memory device of claim 17, wherein cancellation of the reservation triggers a penalty provision imposed on a resource provider providing the resource.

29. A non-transitory computer readable memory medium tangibly embodying a program of machine-readable instructions executable by a digital processing apparatus of a computer system to perform operations for managing an advance resource reservation system, the operations comprising:

receiving, from one of a plurality of potential resource users, an advance reservation request that specifies a set of reservation fulfillment requirements that comprises multiple reservation fulfillment options indicating various ways in which a resource provider may satisfy the set of reservation fulfillment requirements, wherein a business value is assigned to each of the multiple reservation fulfillment options; and analyzing the received advance reservation request to determine if a reservation can be granted that specifies at least one of the multiple reservation fulfillment options, where analyzing comprises at a predetermined time pre-allocating a resource among the plurality of potential resource users submitted advance reservation requests, the resource pre-allocation being based at least in part on a pre-determined value allocation criterion applied to the business values associated with the multiple reservation fulfillment option from the one potential user and from others of the plurality of potential resource users submitting advance reservation requests.

30. A method for managing an advance resource reservation system, comprising:

receiving, from one of a plurality of potential resource users, an advance reservation request that specifies a set of reservation fulfillment requirements that comprises multiple reservation fulfillment options indicating various ways in which a resource provider may satisfy the set of reservation fulfillment requirements, wherein a business value is assigned to each of the multiple reservation fulfillment options; and analyzing by a digital processing apparatus, the received advance reservation request to determine if a reservation can be granted that specifies at least one of the multiple reservation fulfillment options, where analyzing comprises at a predetermined time pre-allocating a resource among the plurality of potential resource users submitted advance reservation requests, the resource pre-allocation being based at least in part on a pre-determined value allocation criterion applied to the business values associated with the multiple reservation fulfillment option from the one potential user and from others of the plurality of potential resource users submitting advance reservation requests.

31. A system comprising:

at least one memory configured to store at least one program of machine-readable instructions, wherein the at least one program performs operations for managing allocation of a resource to potential resource users; and at least one processor coupled to the at least one memory, where the at least one processor performs at least the following operations when the at least one program is executed:

receiving, from one of a plurality of potential resource users, an advance reservation request that specifies a set of reservation fulfillment requirements that comprises multiple reservation fulfillment options indicating various ways in which a resource provider may satisfy the set of reservation fulfillment requirements, wherein a business value is assigned to each of the multiple reservation fulfillment options; and analyzing the received advance reservation request to determine if a reservation can be granted that specifies at least one of the multiple reservation fulfillment options, where analyzing comprises at a predetermined time pre-allocating the resource among the plurality of potential resource users submitted advance reservation requests, the resource pre-allocation being based at least in part on a pre-determined value allocation criterion applied to the business values associated with the multiple reservation fulfillment option from the one potential user and from others of the plurality of potential resource users submitting advance reservation requests.

32. The system of claim 31, wherein the business value assigned to each of the multiple reservation fulfillment options is selected by a potential resource user prior to a time when an advance reservation request containing the multiple reservation fulfillment options is submitted to the advance resource reservation system.

33. The system of claim 31, wherein the business value assigned to each of the multiple reservation fulfillment options is selected by the resource provider after an advance reservation request containing the multiple reservation fulfillment options is received by the advance resource reservation system.

34. The system of claim 31, wherein at least one of the multiple reservation fulfillment requirement options specified in a particular advance reservation request concerns an amount of resource required by the potential resource user issuing the particular advance reservation request.

35. The system of claim 31, wherein the at least one of the multiple reservation fulfillment requirement options specified in a particular advance reservation request concerns a time when the resource is required by the potential resource user issuing the particular advance reservation request.

* * * * *